(12) United States Patent
Yao et al.

(10) Patent No.: US 11,808,161 B2
(45) Date of Patent: Nov. 7, 2023

(54) FLOW CONTROL MECHANISM FOR NACELLE OF TURBOFAN ENGINE

(71) Applicant: General Electric Company, Schenectady, NY (US)

(72) Inventors: Jixian Yao, Niskayuna, NY (US); Kishore Ramakrishnan, Rexford, NY (US); Trevor Howard Wood, Clifton Park, NY (US); Mustafa Dindar, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/717,387

(22) Filed: Apr. 11, 2022

(65) Prior Publication Data

US 2023/0323791 A1 Oct. 12, 2023

(51) Int. Cl.
*F01D 25/24* (2006.01)
*B64C 21/06* (2023.01)
*B64C 21/02* (2006.01)

(52) U.S. Cl.
CPC .............. *F01D 25/24* (2013.01); *B64C 21/02* (2013.01); *B64C 21/06* (2013.01); *F05D 2220/323* (2013.01); *F05D 2240/14* (2013.01); *F05D 2260/60* (2013.01)

(58) Field of Classification Search
CPC ......... F01D 25/24; B64C 21/06; B64C 21/02; B64C 21/025; F05D 2220/323; F05D 2240/14; F05D 2260/60
See application file for complete search history.

(56) References Cited

U.S. PATENT DOCUMENTS

| | | |
|---|---|---|
| 3,702,121 A | 11/1972 | Millman |
| 3,871,844 A | 3/1975 | Calvin, Sr. |
| 8,459,597 B2 | 6/2013 | Cloft et al. |
| 9,938,852 B2 | 4/2018 | Lumbab et al. |
| 10,336,460 B2 | 7/2019 | Ravise et al. |
| 10,532,820 B2 | 1/2020 | Caruel |
| 11,084,599 B2 | 8/2021 | Iglewski et al. |
| 2009/0140104 A1 | 6/2009 | Surply et al. |
| 2017/0121030 A1* | 5/2017 | Pastouchenko ........ B64D 27/16 |
| 2021/0122484 A1 | 4/2021 | Jodet et al. |

* cited by examiner

*Primary Examiner* — Jacob M Amick
(74) *Attorney, Agent, or Firm* — Dority & Manning, P.A.

(57) ABSTRACT

A turbofan engine is provided. The turbofan engine includes a fan comprising a plurality of fan blades; and a nacelle that circumferentially surrounds the fan, the nacelle comprising an annular wall having an exterior surface and an interior surface, the exterior surface comprising a first exterior portion, and the interior surface comprising a first interior portion, wherein a first exterior portion is formed of a first structure defining an exterior surface porosity, and wherein a first interior portion is formed of a second structure defining an interior surface porosity.

19 Claims, 9 Drawing Sheets

FLOW CONTROL MECHANISM FOR NACELLE OF TURBOFAN ENGINE

TECHNICAL FIELD

The present subject matter relates generally to a gas turbine engine, or more particularly to a turbofan engine having a flow control mechanism for a nacelle of the turbofan engine.

BACKGROUND

A turbofan engine generally includes a fan having a plurality of fan blades and a turbomachine arranged in flow communication with one another. Additionally, the turbomachine of the turbofan engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

However, during a crosswind condition, a flow of air has to turn ninety (90) degrees or more to enter into the engine, such as, e.g., an outer nacelle of the engine. Such distorted flow to a fan section of the engine affects the thrust, aeromechanics, and operability of the engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
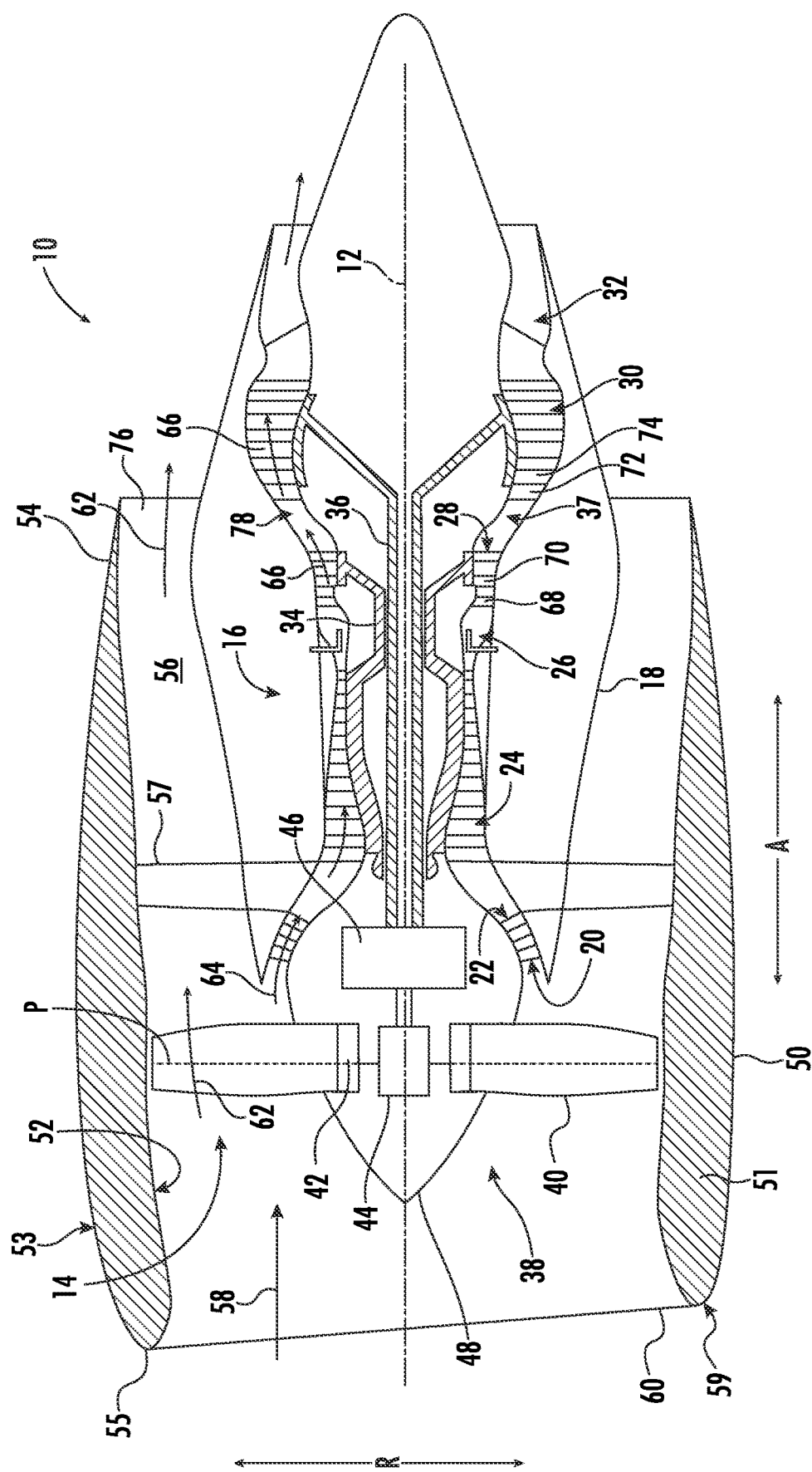
FIG. 1 is a schematic cross-sectional view of an exemplary gas turbine engine according to an exemplary embodiment of the present subject matter.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The following description is provided to enable those skilled in the art to make and use the described embodiments contemplated for carrying out the disclosure. Various modifications, equivalents, variations, and alternatives, however, will remain readily apparent to those skilled in the art. Any and all such modifications, variations, equivalents, and alternatives are intended to fall within the scope of the present disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the disclosure as it is oriented in the drawing figures. However, it is to be understood that the disclosure may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Additionally, the terms "low," "high," or their respective comparative degrees (e.g., lower, higher, where applicable)

each refer to relative speeds or pressures within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section. An engine of the present disclosure may also include an intermediate pressure turbine, e.g., an engine having three spools.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In a crosswind condition, a flow of air has to turn ninety (90) degrees or more to enter into an engine, e.g., an outer nacelle. Such distorted flow to a fan section of the engine affects the thrust, aeromechanics, and operability of the engine. These problems are due to a lack of communication of the flow of air between an exterior surface and an interior surface of the outer nacelle.

The flow control mechanisms of the present disclosure provide communication of a flow of air between an exterior surface and an interior surface of an outer nacelle during a crosswind condition, e.g., at a location upstream of the fan section. In this manner, the operability of an engine during a crosswind condition is improved.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is an aeronautical, turbofan jet engine 10, referred to herein as "turbofan engine 10", configured to be mounted to an aircraft, such as in an under-wing configuration or tail-mounted configuration. As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan 10 includes a fan section 14 and a turbomachine 16 disposed downstream from the fan section 14 (the turbomachine 16 sometimes also, or alternatively, referred to as a "core turbine engine").

The exemplary turbomachine 16 depicted generally includes a substantially tubular outer casing 18 that defines an annular inlet 20. The outer casing 18 encases, in serial flow relationship, a compressor section including a first, booster or low pressure (LP) compressor 22 and a second, high pressure (HP) compressor 24; a combustion section 26; a turbine section including a first, high pressure (HP) turbine 28 and a second, low pressure (LP) turbine 30; and a jet exhaust nozzle section 32. A high pressure (HP) shaft 34 drivingly connects the HP turbine 28 to the HP compressor 24. A low pressure (LP) shaft 36 drivingly connects the LP turbine 30 to the LP compressor 22. The compressor section, combustion section 26, turbine section, and jet exhaust nozzle section 32 are arranged in serial flow order and together define a core air flowpath 37 through the turbomachine 16. It is also contemplated that the present disclosure is compatible with an engine having an intermediate pressure turbine, e.g., an engine having three spools.

Referring still the embodiment of FIG. 1, the fan section 14 includes a variable pitch, single stage fan 38, the turbomachine 16 operably coupled to the fan 38 for driving the fan 38. The fan 38 includes a plurality of rotatable fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40, e.g., in unison. The fan blades 40, disk 42, and actuation member 44 are together rotatable about the longitudinal centerline 12 by LP shaft 36 across a power gear box 46. The power gear box 46 may include a gear or a plurality of gears for stepping down the rotational speed of the LP shaft 36 to a more efficient rotational fan speed. Accordingly, for the embodiment depicted, the turbomachine 16 is operably coupled to the fan 38 through the power gear box 46. In an alternate embodiment, the fan may be a fixed pitch fan. In yet another embodiment, the LP shaft 36 directly drives the single stage fan 38 without a gear box.

In exemplary embodiments, the fan section 14 includes twenty-two (22) or fewer fan blades 40. In certain exemplary embodiments, the fan section 14 includes twenty (20) or fewer fan blades 40. In certain exemplary embodiments, the fan section 14 includes eighteen (18) or fewer fan blades 40. In certain exemplary embodiments, the fan section 14 includes sixteen (16) or fewer fan blades 40. In certain exemplary embodiments, it is contemplated that the fan section 14 includes other number of fan blades 40 for a particular application.

In exemplary embodiments, the fan 38 has a fan diameter that is greater than 80 inches. In other exemplary embodiments, the fan 38 has a fan diameter that is greater than 80 inches and that is less than 216 inches. In other exemplary embodiments, the fan 38 has a fan diameter that is greater than 80 inches and that is less than 336 inches. In other exemplary embodiments, the fan 38 has a fan diameter that is less than 80 inches.

Referring still to the exemplary embodiment of FIG. 1, the disk 42 is covered by rotatable front nacelle or hub 48 aerodynamically contoured to promote an airflow through the plurality of fan blades 40. Additionally, the exemplary fan section 14 includes an annular fan casing or outer nacelle 50 that at least partially, and for the embodiment depicted, circumferentially, surrounds the fan 38 and at least a portion of the turbomachine 16.

More specifically, the outer nacelle 50 includes an annular wall 51 having an interior surface 52, an exterior surface 53, a lip portion 55 at a leading edge 59, and a downstream section 54 of the annular wall 51 of the outer nacelle 50 extends over an outer portion of the turbomachine 16 so as to define a bypass airflow passage 56 therebetween. Additionally, for the embodiment depicted, the outer nacelle 50 is supported relative to the turbomachine 16 by a plurality of circumferentially spaced outlet guide vanes 57.

In an exemplary embodiment, a ratio of the length of the outer nacelle 50 (e.g., from a leading edge of a fan tip to a lip of the outer nacelle 50) to a maximum diameter of the turbofan engine 10 is equal to or less than approximately 0.5. In other exemplary embodiments, the ratio of the length of the outer nacelle 50 (e.g., from a leading edge of a fan tip to a lip of the outer nacelle 50) to a maximum diameter of the turbofan engine 10 is equal to or less than approximately 0.4. In other exemplary embodiments, a ratio of the length of the outer nacelle 50 (e.g., from a leading edge of a fan tip to a lip of the outer nacelle 50) to a maximum diameter of the turbofan engine 10 is equal to or less than approximately 0.25.

During operation of the turbofan engine 10, a volume of air 58 enters the turbofan engine 10 through an associated inlet 60 of the outer nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37. The ratio between an amount of airflow through the bypass airflow passage 56 (i.e., the first portion of air indicated by arrows 62) to an amount of airflow through the core air flowpath 37 (i.e., the second portion of air indicated by arrows 64) is known as a bypass ratio. In exemplary embodiments, the bypass ratio during operation of the turbofan engine 10 (e.g., at a rated speed) is greater than or equal to about twelve (12).

Referring still to FIG. 1, the compressed second portion of air indicated by arrows 64 from the compressor section mixes with fuel and is burned within the combustion section to provide combustion gases 66. The combustion gases 66 are routed from the combustion section 26, through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air indicated by arrows 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

Moreover, it should be appreciated that the exemplary turbofan engine 10 depicted in FIG. 1 is by way of example only, and that in other exemplary embodiments, the turbofan engine 10 may have any other suitable configuration. For example, in certain exemplary embodiments, the fan may not be a variable pitch fan, the engine may not include a reduction gearbox (e.g., power gearbox 46) driving the fan, may include any other suitable number or arrangement of shafts, spools, compressors, turbines, etc.

Figure 2:
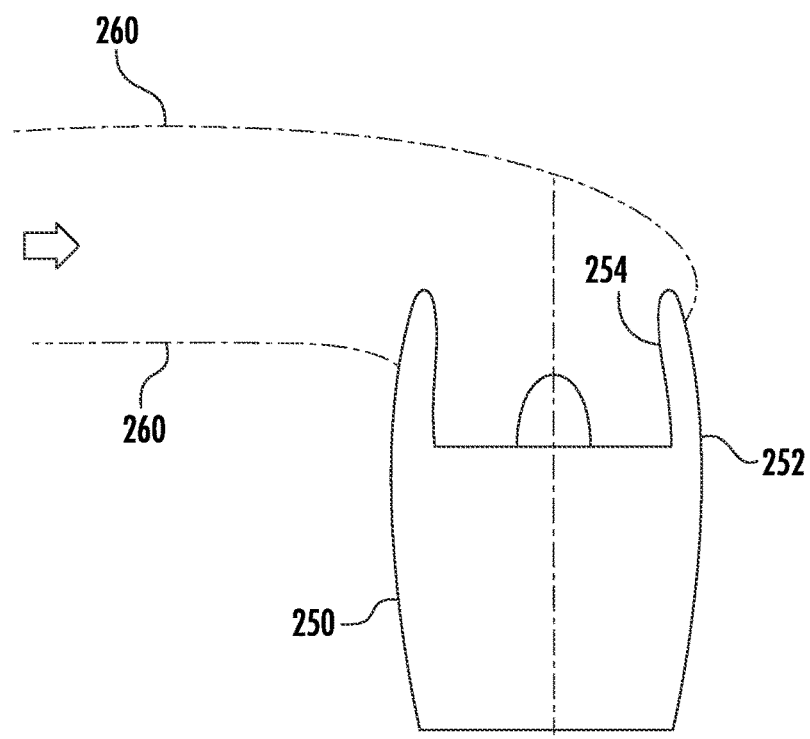
FIG. 2 is a schematic cross-sectional view of an exemplary gas turbine engine in a crosswind condition according to an exemplary embodiment of the present subject matter.

Referring now to FIG. 2, a cross-sectional view of an outer nacelle 250 in a crosswind condition is provided. In the situation depicted, a flow of air 260 has to turn ninety (90) degrees or more to enter into the engine, e.g., the outer nacelle 250. Such distorted flow to a fan section, e.g., fan section 38 (FIG. 1), affects the thrust, aeromechanics, and operability of the engine. These problems are due to a lack of communication of the flow of air 260 between an exterior surface 252 and an interior surface 254 of the outer nacelle 250. Notably, similar problems may be caused during certain engine operations, such as a steep angle takeoff or climb operation. This condition is a similar condition to crosswind where the "crosswind" flow direction indicated in FIG. 2 now directs upward from below the engine, compared to the side, at some angle defined by the aircraft pitch angle and the horizontal flow speed.

Figure 3:
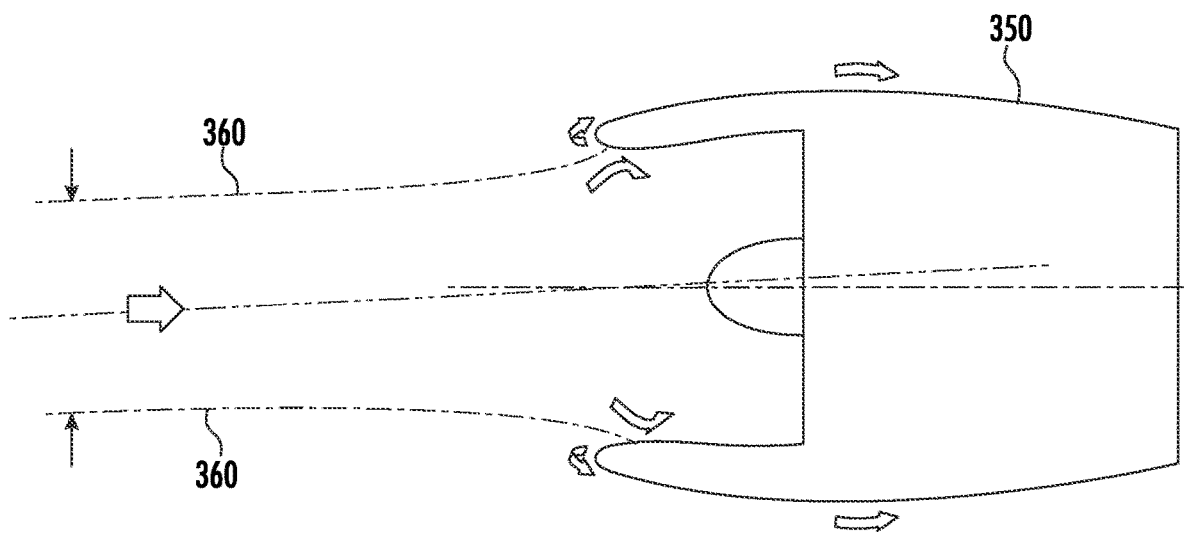
FIG. 3 is a schematic cross-sectional view of an exemplary gas turbine engine in a cruise condition according to an exemplary embodiment of the present subject matter.

Referring now to FIG. 3, a cross-sectional view of an outer nacelle 350 in a cruise condition is provided. In the situation depicted, in the cruise condition, a flow of air 360 is able to enter into the engine, e.g., the outer nacelle 350, without the problems discussed above with an outer nacelle in a crosswind condition.

The flow control mechanisms of the present disclosure provide communication of a flow of air between an exterior surface and an interior surface of an outer nacelle during, e.g., a crosswind condition. In this manner, the operability of an engine during a crosswind condition is improved.

Figure 4:
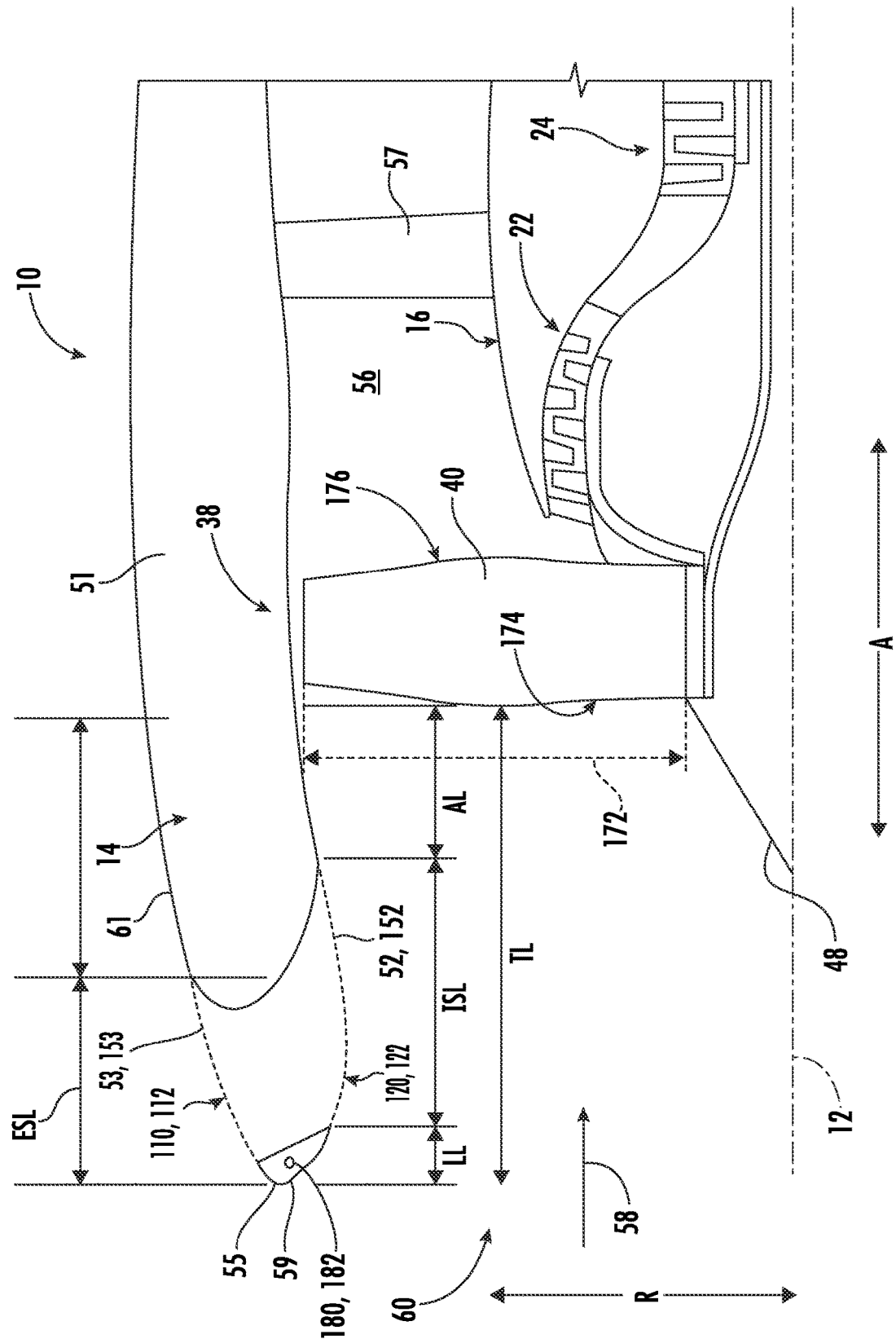
FIG. 4 is a close-up, schematic, cross-sectional view of a forward end of the exemplary gas turbine engine of FIG. 1 according to an exemplary embodiment of the present subject matter.

Referring now to FIG. 4, a close-up, cross-sectional view of the outer nacelle 50, the fan section 14, and forward end of the turbomachine 16 of the exemplary turbofan engine 10 of FIG. 1 is provided.

In the exemplary embodiment depicted, the outer nacelle 50 includes the lip portion 55 at the leading edge 59, the interior surface 52, the exterior surface 53, and an aft portion 61. As shown, a first interior portion 152 of the interior surface 52 is located between the lip portion 55 and the aft portion 61 and a first exterior portion 153 of the exterior surface 53 is located between the lip portion 55 and the aft portion 61.

The first interior portion 152 and the first exterior portion 153 are each disposed at a location forward of the plurality of fan blades 40 of the fan 38 along the axial direction A and aft of the inlet 60 of the outer nacelle 50, e.g., aft of the lip portion 55.

In an exemplary embodiment, the lip portion 55 is formed of an impermeable surface. Furthermore, in an exemplary embodiment, the aft portion 61 is formed of an impermeable surface.

In an exemplary embodiment, the first exterior portion 153 of the exterior surface 53 is formed of a first structure 110 defining an exterior surface porosity 112 and the first interior portion 152 of the interior surface 52 is formed of a second structure 120 defining an interior surface porosity 122. The interior surface porosity 122 is greater than the exterior surface porosity 112. In this manner, a pressure gradient between the first interior portion 152 and the first exterior portion 153 encourages a flow of air to pass through. For example, in a crosswind condition (FIG. 2), a flow of air is able to pass through the first structure 110 of the first exterior portion 153 of the exterior surface 53 to the second structure 120 of the first interior portion 152 of the interior surface 52 to provide communication of a flow of air between the exterior surface 53 and the interior surface 52 of the outer nacelle 50.

In an exemplary embodiment, the interior surface porosity 122 is approximately 8% to approximately 10%. In certain exemplary embodiments, the interior surface porosity 122 is approximately 7% to approximately 15%. In certain exemplary embodiments, the interior surface porosity 122 is approximately 5% to approximately 25%.

In an exemplary embodiment, the exterior surface porosity 112 is approximately 4% to approximately 6%. In certain exemplary embodiments, the exterior surface porosity 112 is approximately 4% to approximately 10%. In certain exemplary embodiments, the exterior surface porosity 112 is approximately 2% to approximately 20%.

In an exemplary embodiment, the first structure 110 and the second structure 120 are each formed of a metal weave.

Figure 5:
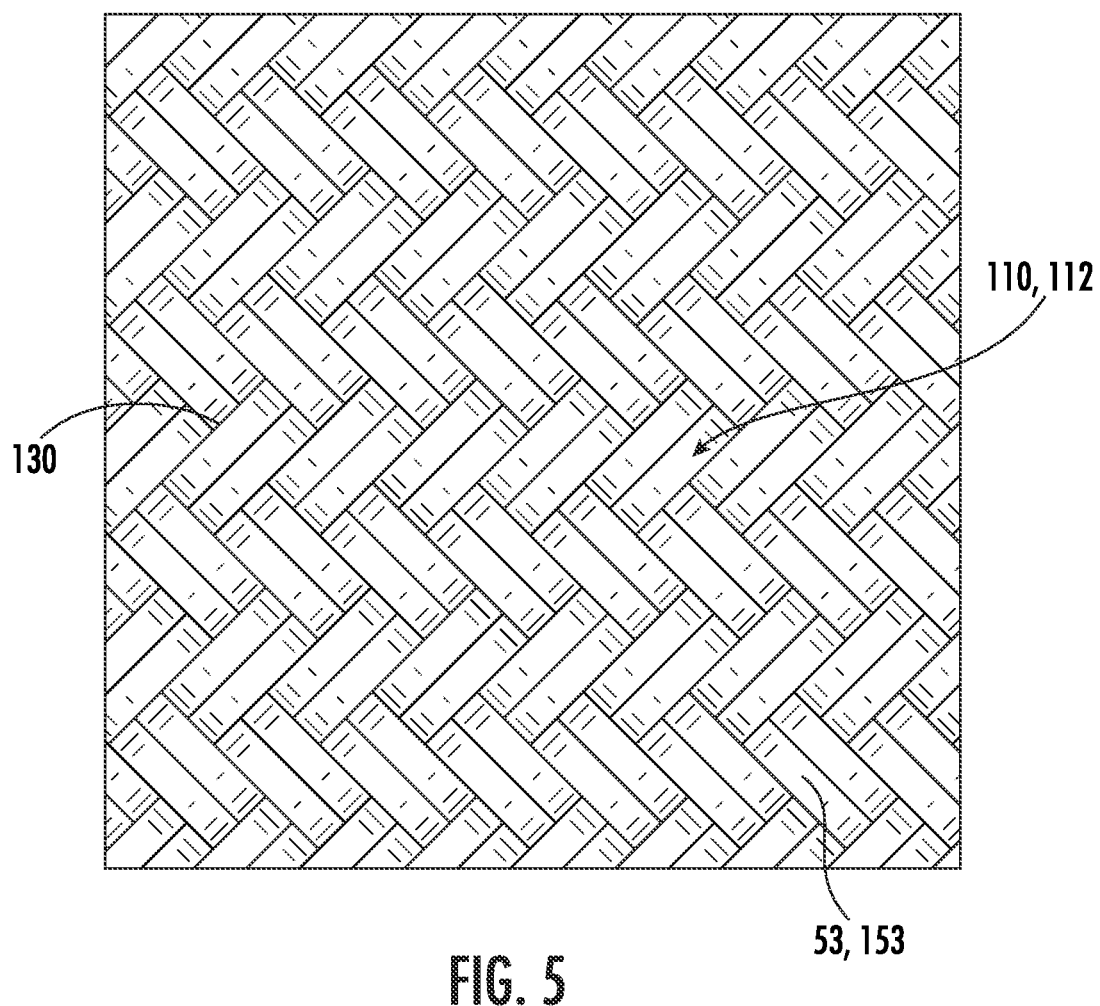
FIG. 5 is a close-up view of a first exterior portion of an exterior surface that is formed of a first structure defining an exterior surface porosity according to an exemplary embodiment of the present subject matter.

Referring now to FIG. 5, a close-up view of a portion of the first exterior portion 153 of the exterior surface 53 that is formed of the first structure 110 defining the exterior surface porosity 112. In the exemplary embodiment depicted, the first structure 110 is formed of a first metal weave 130. For example, the first metal weave 130 may be a strong steel metal weave structure that defines the exterior surface porosity 112.

Figure 6:
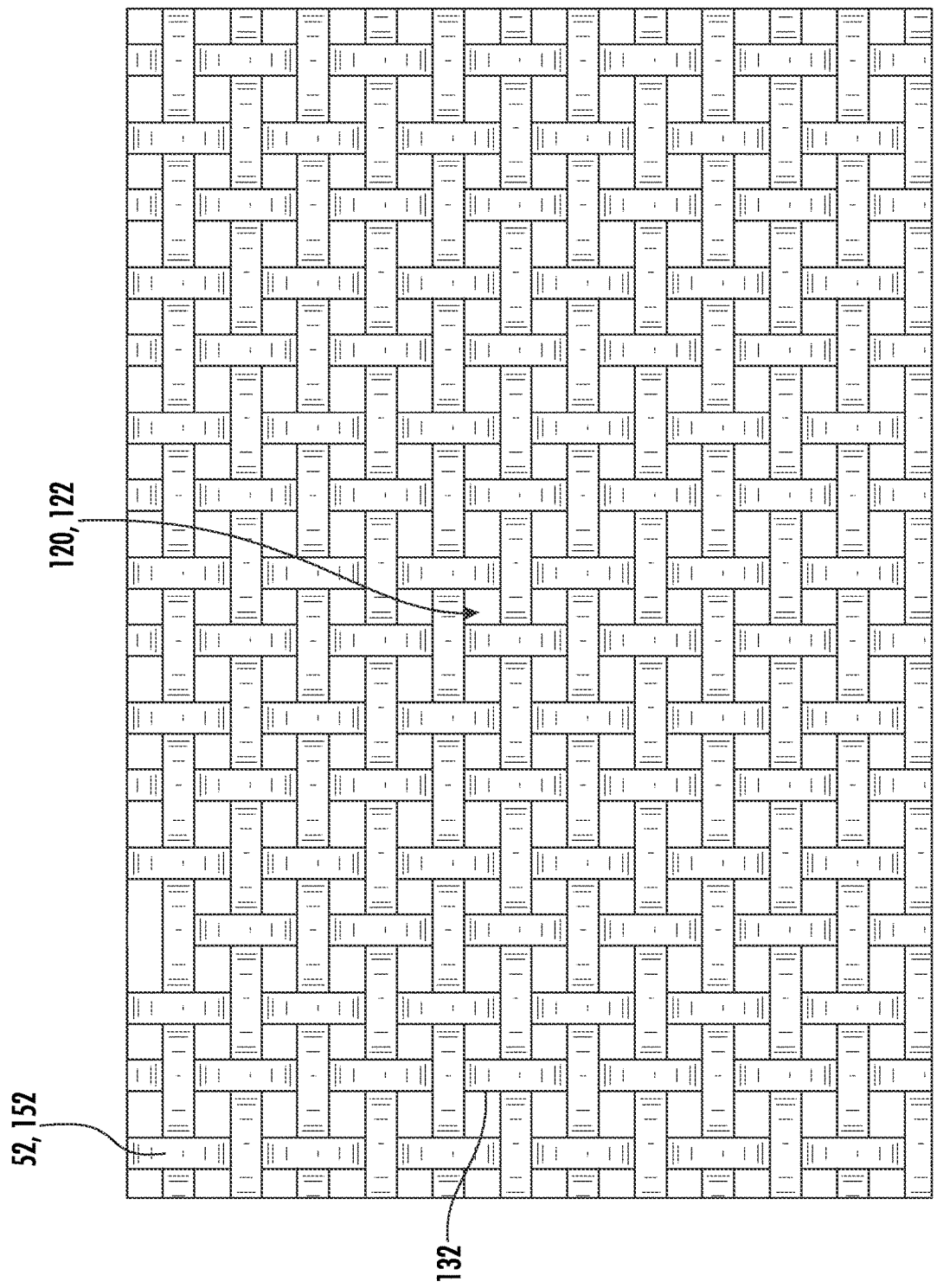
FIG. 6 is a close-up view of a first interior portion of an interior surface that is formed of a second structure defining an interior surface porosity according to an exemplary embodiment of the present subject matter.

Referring now to FIG. 6, a close-up view of a portion of the first interior portion 152 of the interior surface 52 that is formed of the second structure 120 defining the interior surface porosity 122. In the exemplary embodiment depicted, the second structure 120 is formed of a second metal weave 132. For example, the second metal weave 132 may be a loose metal weave structure that defines the interior surface porosity 122.

It will be appreciated, however, that in other exemplary embodiments the first structure 110, the second structure 120, or both may be formed of any other suitable structure, or other suitable porous structure. For example, it is contemplated that the first structure 110, the second structure 120, or both may be formed of a metal wire mesh, a microperforated sheet, a perforated sheet, or other suitable porous structure.

Referring now back to FIG. 4, in an exemplary embodiment, a distance that the outer nacelle 50 extends between the leading edge 59 and the fan blades 40 has a total length TL. For example, the lip portion 55, the first interior portion 152 of the interior surface 52, the first exterior portion 153 of the exterior surface 53, and the aft portion 61 extend a total length TL between the leading edge 59 and the fan blades 40.

In an exemplary embodiment, the lip portion 55 extends a lip length LL that is approximately 15% of the total length TL. In certain exemplary embodiments, the lip portion 55 extends a lip length LL that is approximately 3% to approximately 15% of the total length TL. In certain exemplary embodiments, the lip portion 55 extends a lip length LL that is approximately 10% to approximately 20% of the total length TL.

In an exemplary embodiment, the first exterior portion 153 of the exterior surface 53 extends an exterior surface length ESL that is approximately 5% to approximately 20% of the total length TL. In certain exemplary embodiments, the first exterior portion 153 of the exterior surface 53 extends an exterior surface length ESL that is approximately 10% to approximately 40% of the total length TL. In certain exemplary embodiments, the first exterior portion 153 of the exterior surface 53 extends an exterior surface length ESL that is approximately 30% to approximately 50% of the total length TL.

In an exemplary embodiment, the first interior portion 152 of the interior surface 52 extends an interior surface length ISL that is approximately 5% to approximately 20% of the total length TL. In certain exemplary embodiments, the first interior portion 152 of the interior surface 52 extends an interior surface length ISL that is approximately 10% to approximately 40% of the total length TL. In certain exemplary embodiments, the first interior portion 152 of the interior surface 52 extends an interior surface length ISL that is approximately 30% to approximately 50% of the total length TL.

In an exemplary embodiment, the aft portion 61 extends an aft length AL that is approximately 20% to approximately 60% of the total length TL. In certain exemplary embodiments, the aft portion 61 extends an aft length AL that is approximately 20% to approximately 70% of the total length TL. In certain exemplary embodiments, the aft portion 61 extends an aft length AL that is approximately 20% to approximately 80% of the total length TL.

Referring to FIG. 4, in an exemplary embodiment, the outer nacelle 50 includes a heat source 180 that is in thermal communication with the lip portion 55 of the outer nacelle 50.

For example, in an exemplary embodiment, the heat source 180 includes an electrical heating element 182 disposed at the lip portion 55. In this manner, the electrical heating element 182 is utilized to heat the leading edge 59 of the outer nacelle 50 and operate as a means for reducing ice buildup or ice formation at the leading edge 59 of the outer nacelle 50. In other exemplary embodiments, the heat source 180 includes a pneumatic heating element with electrical plumbing between the interior surface 52 and the exterior surface 53. In other exemplary embodiments, the heat source 180 may include other suitable heating devices.

Referring still to FIG. 4, in an exemplary embodiment, the plurality of fan blades 40 of the fan 38 define a fan blade span 172 along the radial direction R. Each of the plurality of fan blades 40 of the fan 38 also defines a leading edge 174 and a trailing edge 176, and the fan blade span 172 refers to a measure along the radial direction R between a radially outer tip and a base of the fan blade 40 at the leading edge 174 of the respective fan blade 40.

Figure 7:
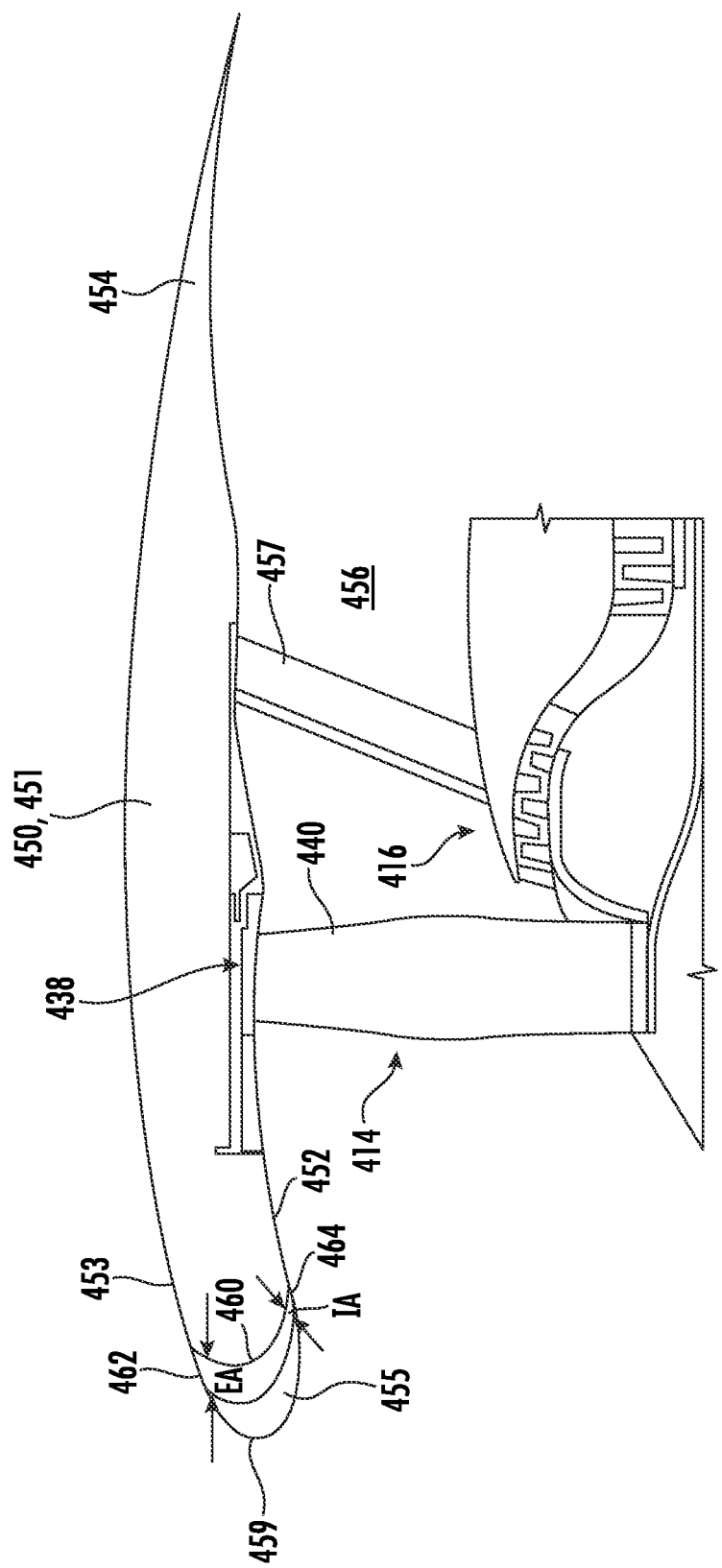
FIG. 7 is a close-up, schematic, cross-sectional view of a forward end of the exemplary gas turbine engine of FIG. 1 according to another exemplary embodiment of the present subject matter.

Referring now to FIG. 7, a close-up, cross-sectional view of an outer nacelle 450, a fan section 414, and forward end of a turbomachine 416 of the exemplary turbofan engine 10 of FIG. 1 is provided.

In the exemplary embodiment depicted, the fan section 414 includes a variable pitch, single stage fan 438, and the turbomachine 416 is operably coupled to the fan 438 for driving the fan 438. The fan 438 includes a plurality of rotatable fan blades 440 coupled to a disk in a spaced apart manner.

Additionally, the exemplary fan section 414 includes the outer nacelle 450 that at least partially, and for the embodiment depicted, circumferentially, surrounds the fan 438 and at least a portion of the turbomachine 416.

More specifically, the outer nacelle 450 includes an annular wall 451 having an interior surface 452, an exterior surface 453, a lip portion 455 at a leading edge 459, and a downstream section 454 of the annular wall 451 of the outer nacelle 450 extends over an outer portion of the turbomachine 416 so as to define a bypass airflow passage 456 therebetween. Additionally, for the embodiment depicted, the outer nacelle 450 is supported relative to the turbomachine 416 by a plurality of circumferentially spaced outlet guide vanes 457.

In the exemplary embodiment depicted, the outer nacelle 450 defines one or more curved flow channels 460 that extend from the exterior surface 453 to the interior surface 452. The one or more curved flow channels 460 are configured to allow a flow of air therethrough during an engine crosswind condition (FIG. 2) and to minimize the flow of air therethrough during an engine cruise condition (FIG. 3). The curvature of the curved flow channel 460 controls the flow of air therethrough.

Figure 8:
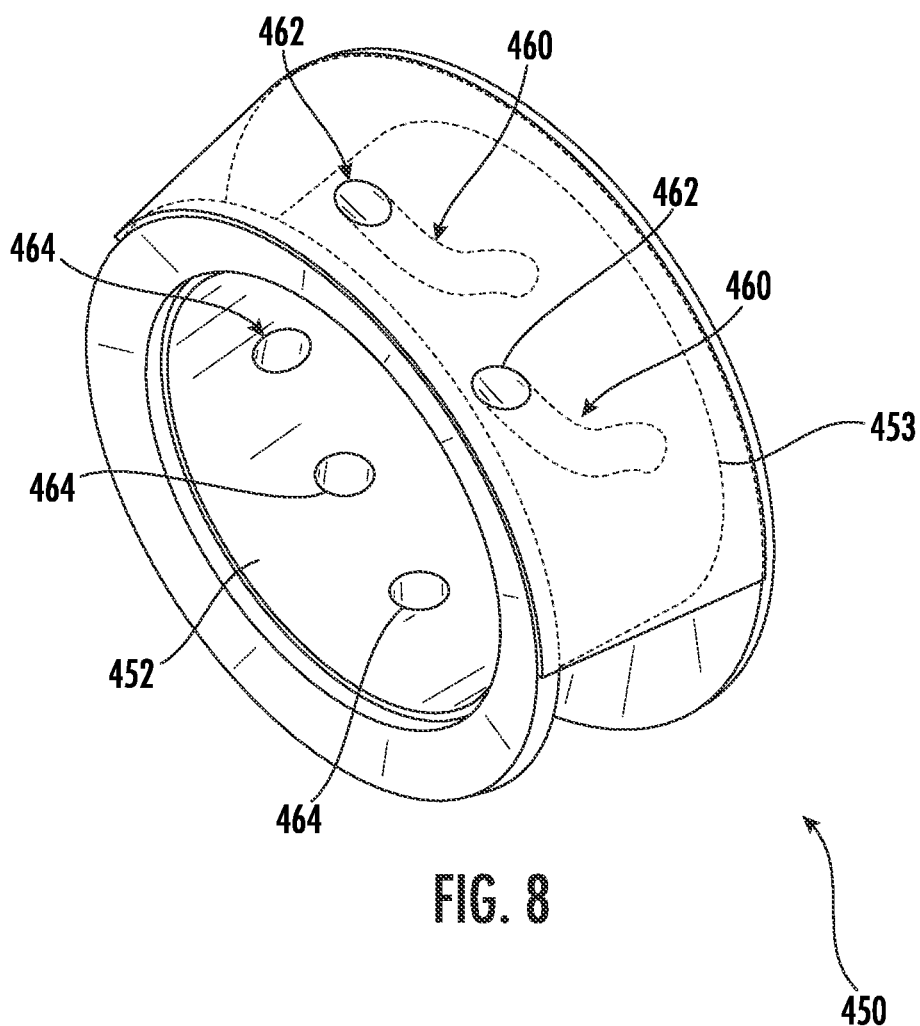
FIG. 8 is a perspective view of a portion of an outer nacelle having one or more flow channels according to another exemplary embodiment of the present subject matter.

Referring now also to FIG. 8, a perspective view of a portion of the outer nacelle 450 of the present disclosure. In the exemplary embodiment depicted, the outer nacelle 450 includes one or more or more curved flow channels 460 that extend from the exterior surface 453 to the interior surface 452. It is contemplated that the one or more curved flow channels 460 of the present disclosure are located at positions around the outer nacelle 450 that are subject to the crosswind conditions described herein. It is also contemplated that the one or more curved flow channels 460 of the present disclosure may be located at positions around the outer nacelle 450 that are subject to other conditions, e.g., angle of attack, cruise, etc. It is further contemplated that the one or more curved flow channels 460 of the present disclosure may be smaller in size than as shown in FIG. 8 for convenience of viewing.

In an exemplary embodiment, the one or more curved flow channels 460 each include an exterior port 462 at the exterior surface 453 and an interior port 464 at the interior surface 452. The exterior port 462 defines an exterior port area EA and the interior port 464 defines an interior port area IA. In the embodiment depicted, the exterior port area EA is greater than the interior port area IA. At cruise conditions (FIG. 3), the air pressure on the interior surface 452 is higher than the exterior surface 453, while at crosswind conditions (FIG. 2), the pressure on the exterior surface 453 is higher than the interior surface 452. In this manner, the difference in area between the exterior port area EA and the interior port area IA discourages a flow of air through the curved flow channel 460 during a cruise condition (FIG. 3) while enabling the flow of air through the curved flow channel 460 during an engine crosswind condition (FIG. 2).

It is contemplated that the angle at which a flow of air is injected into the curved flow channel 460, e.g., from either the interior surface 452 or the exterior surface 453, is approximately 0.1 degrees to approximately 45 degrees with respect to the main flow direction.

Figure 9:
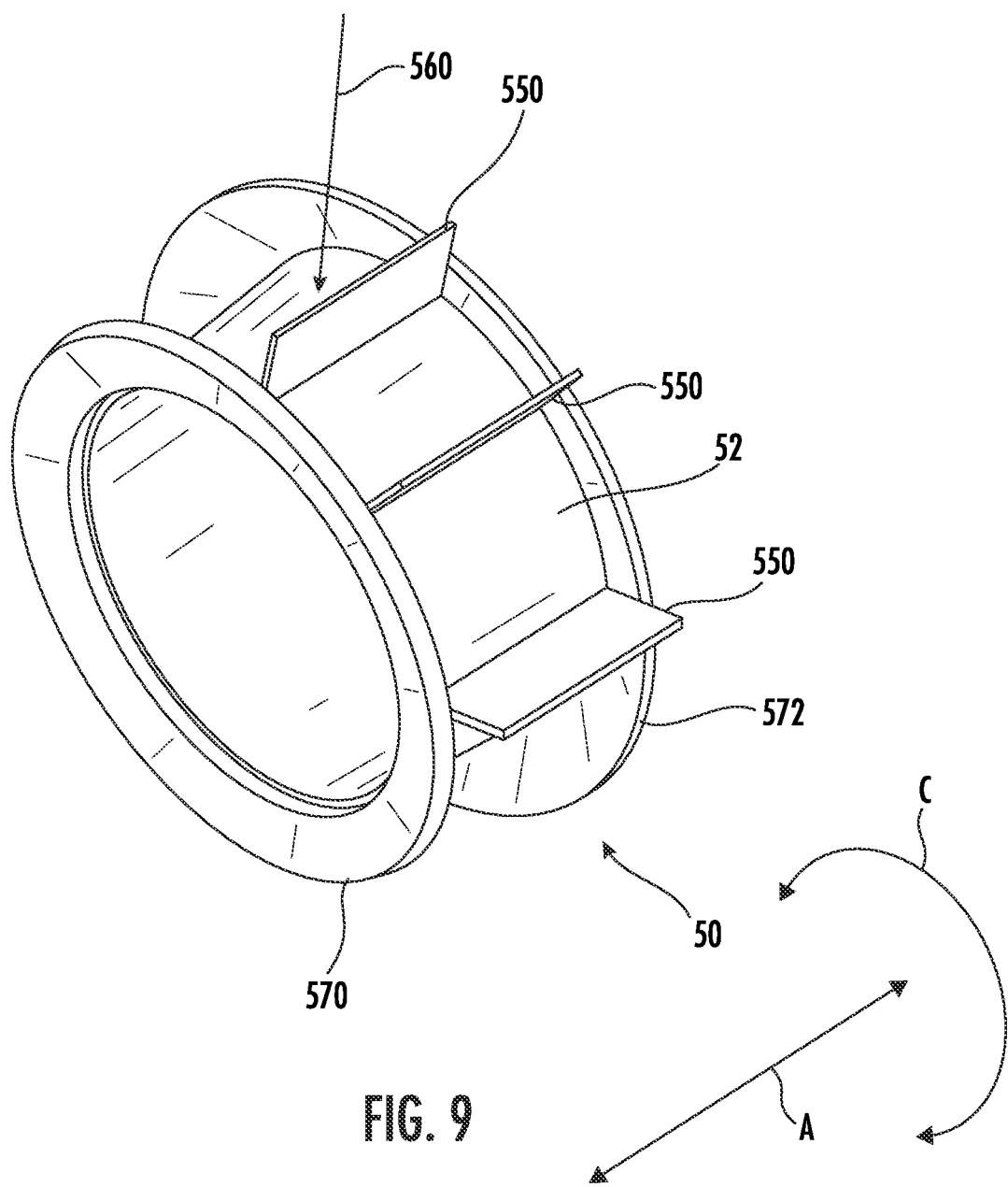
FIG. 9 is a perspective view of a portion of an outer nacelle having one or more partitions according to another exemplary embodiment of the present subject matter.

Referring now to FIG. 9, a perspective view of a portion of the outer nacelle 50 of the present disclosure. In the exemplary embodiment depicted, the outer nacelle 50 includes one or more partitions 550 that extend between the exterior surface 53 (FIG. 4) and the interior surface 52 of the outer nacelle 50 to prevent a flow of air from swirling inside the outer nacelle 50.

For example, the partitions 550 are configured to direct a flow of air 560 that enters the exterior surface 53 (FIG. 4) of the outer nacelle 50 to pass through the interior surface 52 of the outer nacelle 50. In this manner, the partitions 550 prevent the flow of air 560 from swirling inside the outer nacelle 50 in a circumferential direction C and not passing through the interior surface 52 of the outer nacelle 50.

In the exemplary embodiment depicted, the outer nacelle includes a plurality of partitions 550 that are spaced apart in the circumferential direction C around the outer nacelle 50. In exemplary embodiments, the partitions 550 are formed of a plurality of baffles that extend in an axial direction A from a first end 570 to a second end 572 of the outer nacelle 50.

Figure 10:
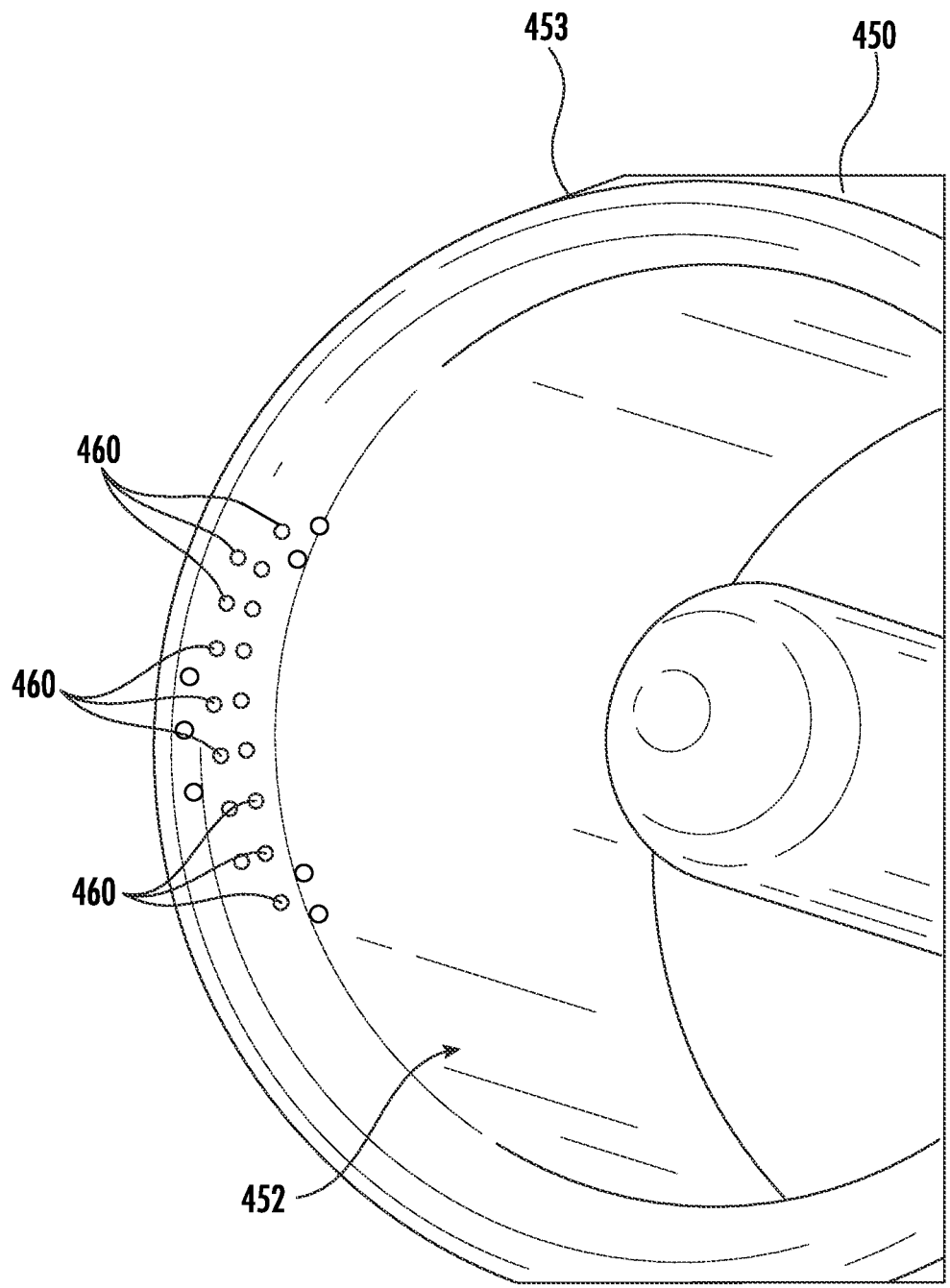
FIG. 10 is a close-up, perspective view of a forward end of the exemplary gas turbine engine of FIG. 7 according to another exemplary embodiment of the present subject matter.

Referring now to FIG. 10, a close-up, perspective view of the outer nacelle 450 of the exemplary outer nacelle 450 of FIG. 7 is provided. In the embodiment depicted, the outer nacelle 450 defines a plurality of curved flow channels 460 that extend from the exterior surface 453 to the interior surface 452. Notably, in the embodiment depicted, an outlet of each of these curved flow channels 460 (the outlets being the openings shown in FIG. 10 on the interior surface 452) are generally configured to follow an anticipated location of a separation of a flow over and into the outer nacelle 450. In particular, for the embodiment shown, the outlets of the curved flow channels 460 generally define a "V" shape, with a middle group positioned closest to a leading edge of the outer nacelle 450 and the outer groups positioned farther from the leading edge of the outer nacelle 450 according to the separated flow pattern for which the feature is designed to mitigate. In other exemplary embodiments, it is also contemplated that the outlets of the curved flow channels 460 may generally define a "U" shape, with a middle group positioned closest to a leading edge of the outer nacelle 450 and the outer groups positioned farther from the leading edge of the outer nacelle 450 according to the separated flow pattern for which the feature is designed to mitigate.

Further aspects of the disclosure are provided by the subject matter of the following clauses:

A turbofan engine, comprising: a fan comprising a plurality of fan blades; and a nacelle that circumferentially surrounds the fan, the nacelle comprising an annular wall having an exterior surface and an interior surface, the exterior surface comprising a first exterior portion, and the interior surface comprising a first interior portion, wherein a first exterior portion is formed of a first structure defining an exterior surface porosity, and wherein a first interior portion is formed of a second structure defining an interior surface porosity.

The turbofan engine of any preceding clause, wherein the interior surface porosity is approximately 5% to approximately 25%, and wherein the exterior surface porosity is approximately 2% to approximately 20%.

The turbofan engine of any preceding clause, wherein the interior surface porosity is approximately 7% to approximately 15%, and wherein the exterior surface porosity is approximately 4% to approximately 10%.

The turbofan engine of any preceding clause, wherein the first structure and the second structure are each formed of a metal weave.

The turbofan engine of any preceding clause, wherein the first exterior portion and the first interior portion are each located forward of the plurality of fan blades of the fan.

The turbofan engine of any preceding clause, wherein the turbofan engine further comprises a lip portion at a leading edge of the nacelle, wherein the lip portion is formed of an impermeable surface.

The turbofan engine of any preceding clause, wherein the lip portion includes a heating element.

The turbofan engine of any preceding clause, wherein the first exterior portion and the first interior portion are each located aft of the lip portion.

The turbofan engine of any preceding clause, wherein a distance that the nacelle extends between the lip portion and the plurality of fan blades has a total length, wherein the lip portion extends approximately 3% to approximately 15% of the total length.

The turbofan engine of any preceding clause, wherein the first exterior portion and the first interior portion extend approximately 5% to approximately 20% of the total length.

The turbofan engine of any preceding clause, further comprising one or more partitions between the exterior surface and the interior surface to prevent a flow of air from swirling inside the nacelle.

A nacelle assembly for a turbofan engine, the turbofan engine comprising a fan, the nacelle assembly configured to circumferentially surround the fan, the nacelle assembly defining a forward end, the nacelle assembly comprising: an annular wall located at the forward end of the nacelle assembly having an exterior surface and an interior surface, the exterior surface comprising a first exterior portion, and the interior surface comprising a first interior portion, wherein the first exterior portion is formed of a first structure defining an exterior surface porosity, and wherein the first interior portion is formed of a second structure defining an interior surface porosity.

The nacelle assembly of any preceding clause, wherein the interior surface porosity is approximately 5% to approximately 25%, and wherein the exterior surface porosity is approximately 2% to approximately 20%.

The nacelle assembly of any preceding clause, wherein the interior surface porosity is approximately 7% to approximately 15%, and wherein the exterior surface porosity is approximately 4% to approximately 10%.

The nacelle assembly of any preceding clause, wherein the interior surface porosity is approximately 5% to approximately 25%, and wherein the exterior surface porosity is approximately 2% to approximately 20%.

The nacelle assembly of any preceding clause, further comprising a lip portion at a leading edge of the nacelle assembly, wherein the lip portion is formed of an impermeable surface, and wherein the first exterior portion and the first interior portion are each located aft of the lip portion.

The nacelle assembly of any preceding clause, wherein a distance that the nacelle assembly extends between the lip portion and the fan has a total length, wherein the lip portion extends approximately 3% to approximately 15% of the total length, and wherein the first exterior portion and the first interior portion extend approximately 5% to approximately 20% of the total length.

A turbofan engine, comprising: a fan comprising a plurality of fan blades; and a nacelle that circumferentially surrounds the fan, the nacelle comprising an annular wall having an exterior surface and an interior surface, wherein the nacelle defines one or more curved flow channels extending from the exterior surface to the interior surface.

The turbofan engine of any preceding clause, wherein the one or more curved flow channels each include an exterior port at the exterior surface and an interior port at the interior surface.

The turbofan engine of any preceding clause, wherein the exterior port defines an exterior port area and the interior port defines an interior port area, and wherein the exterior port area is greater than the interior port area.

The turbofan engine of any preceding clause, wherein an angle at which a flow of air is injected into the one or more curved flow channels is approximately 0.1 degrees to approximately 45 degrees with respect to a main flow direction.

The turbofan engine of any preceding clause, wherein the one or more curved flow channels are configured to allow a flow of air therethrough during an engine crosswind condition.

The turbofan engine of any preceding clause, wherein the one or more curved flow channels are configured to minimize the flow of air therethrough during an engine cruise condition.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A turbofan engine, comprising:
a fan comprising a plurality of fan blades; and
a nacelle that circumferentially surrounds the fan, the nacelle comprising an annular wall having an exterior surface and an interior surface, the exterior surface comprising a first exterior portion, and the interior surface comprising a first interior portion,
wherein the first exterior portion is formed of a first structure defining an exterior surface porosity, and
wherein the first interior portion is formed of a second structure defining an interior surface porosity that is greater than the exterior surface porosity.

2. The turbofan engine of claim 1, wherein the interior surface porosity is approximately 5% to approximately 25%, and wherein the exterior surface porosity is approximately 2% to approximately 20%.

3. The turbofan engine of claim 1, wherein the interior surface porosity is approximately 7% to approximately 15%, and wherein the exterior surface porosity is approximately 4% to approximately 10%.

4. The turbofan engine of claim 1, wherein the first structure and the second structure are each formed of a metal weave.

5. The turbofan engine of claim 1, wherein the first exterior portion and the first interior portion are each located forward of the plurality of fan blades of the fan.

6. The turbofan engine of claim 1, further comprising a lip portion at a leading edge of the nacelle, wherein the lip portion is formed of an impermeable surface.

7. The turbofan engine of claim 6, wherein the lip portion includes a heating element.

8. The turbofan engine of claim 6, wherein the first exterior portion and the first interior portion are each located aft of the lip portion.

9. The turbofan engine of claim 8, wherein a distance that the nacelle extends between the lip portion and the plurality of fan blades has a total length, wherein the lip portion extends approximately 3% to approximately 15% of the total length, and wherein the first exterior portion and the first interior portion extend approximately 5% to approximately 20% of the total length.

10. The turbofan engine of claim 1, further comprising one or more partitions between the exterior surface and the interior surface to prevent a flow of air from swirling inside the nacelle.

11. A nacelle assembly for a turbofan engine, the turbofan engine comprising a fan, the nacelle assembly configured to circumferentially surround the fan, the nacelle assembly defining a forward end, the nacelle assembly comprising:

an annular wall located at the forward end of the nacelle assembly having an exterior surface and an interior surface, the exterior surface comprising a first exterior portion, and the interior surface comprising a first interior portion, wherein the first exterior portion is formed of a first structure defining an exterior surface porosity, and wherein the first interior portion is formed of a second structure defining an interior surface porosity that is greater than the exterior surface porosity.

12. The nacelle assembly of claim 11, wherein the interior surface porosity is approximately 5% to approximately 25%, and wherein the exterior surface porosity is approximately 2% to approximately 20%.

13. The nacelle assembly of claim 11, wherein the interior surface porosity is approximately 7% to approximately 15%, and wherein the exterior surface porosity is approximately 4% to approximately 10%.

14. The nacelle assembly of claim 11, further comprising a lip portion at a leading edge of the nacelle assembly, wherein the lip portion is formed of an impermeable surface, and wherein the first exterior portion and the first interior portion are each located aft of the lip portion.

15. The nacelle assembly of claim 14, wherein a distance that the nacelle assembly extends between the lip portion and the fan has a total length, wherein the lip portion extends approximately 3% to approximately 15% of the total length, and wherein the first exterior portion and the first interior portion extend approximately 5% to approximately 20% of the total length.

16. A turbofan engine, comprising:

a fan comprising a plurality of fan blades; and a nacelle that circumferentially surrounds the fan, the nacelle comprising an annular wall having an exterior surface and an interior surface, wherein the nacelle defines one or more curved flow channels extending from the exterior surface to the interior surface, wherein the one or more curved flow channels each include an exterior port at the exterior surface and an interior port at the interior surface, and wherein the exterior port defines an exterior port area and the interior port defines an interior port area, and wherein the exterior port area is greater than the interior port area.

17. The turbofan engine of claim 16, wherein an angle at which a flow of air is injected into the one or more curved flow channels is approximately 0.1 degrees to approximately 45 degrees with respect to a main flow direction.

18. The turbofan engine of claim 17, wherein the one or more curved flow channels are configured to allow a flow of air therethrough during an engine crosswind condition.

19. The turbofan engine of claim 18, wherein the one or more curved flow channels are configured to minimize the flow of air therethrough during an engine cruise condition.

* * * * *